Nov. 24, 1964 P. S. SWARTZ ETAL 3,158,792

SUPERCONDUCTIVE DEVICES

Filed Nov. 2, 1961 2 Sheets-Sheet 1

Inventors:
Paul S. Swartz,
Carl H. Rosner,
by Paul R. Webb, II
Their Attorney.

Nov. 24, 1964 P. S. SWARTZ ETAL 3,158,792

SUPERCONDUCTIVE DEVICES

Filed Nov. 2, 1961 2 Sheets-Sheet 2

Inventors.
Paul S. Swartz,
Carl H. Rosner,
by Paul R. Webb, II
Their Attorney.

United States Patent Office 3,158,792

Patented Nov. 24, 1964

3,158,792

SUPERCONDUCTIVE DEVICES

Paul S. Swartz and Carl H. Rosner, Schenectady, N.Y., assignors to General Electric Company, a corporation of New York Filed Nov. 2, 1961, Ser. No. 149,595
6 Claims. (Cl. 317—158)

This invention relates to superconductive devices and more particularly to high field superconductive devices for compressing a magnetic field confined within an aperture therein.

While the existence of superconductivity in many metals, metal alloys and metal compounds has been known for many years, the phenomenon has been more or less treated as a scientific curiosity until comparatively recent times. The awakened interest in superconductivity may be attributed, at least in part, to technological advances in the arts where their properties would be extremely advantageous in generators, direct current motors and low frequency transformers, and to advances in cryogenics which removed many of the economic and scientific problems involved in extremely low temperature operations.

As is well known, superconduction is a term describing the type of electrical current conduction existing in certain materials cooled below a critical temperature, $T_c$, where resistance to the flow of current is essentially non-existent. A high field superconductive body is a body with a superconducting phase which remains superconducting in a magnetic field greater than the critical magnetic field of the phase in homogeneous, unstrained bulk form.

The small amount of superconducting current and contemporaneous trapped magnetic flux which can be obtained within a superconducting body has been responsible to some degree for the lack of their use. The applied magnetic field to which a superconductive body is subjected begins to penetrate the skin or surface of the body and immediately creates a supercurrent which precludes the further penetration of the body. This is known as the Meissner effect. The London theory and verifying experiments demonstrated that an applied magnetic field induces currents to flow in a gross superconductor which decrease in magnitude from the outside toward the inside of the body. The result has been that the flux penetration depth and the depth to which the induced superconducting currents flow in a given superconductive material is given in terms of the London penetration depth $\lambda$. However, since the penetration depth $\lambda$ is exceedingly small, for example, less than about 1000 A. in most materials, it has not been possible to increase the quantity of penetrating magnetic flux in gross superconductive bodies. An increase in the magnitude of the applied magnetic field does not extend the limit, since this limit is fixed at the critical field, $H_c$, which results in the creation of a critical current density, $J_c$, in the surface of the superconductor and drives it normally resistive, or non-superconducting.

It has been found that high field superconductive bodies possess higher critical fields, $H_c$, than homogeneous, unstrained bulk superconductive bodies and available evidence increasingly supports the proposition that the higher critical fields and therefore higher current densities, are manifestations of the microstructure in hard superconductive bodies. Specifically, the magnetic properties of high field superconductors are felt to inhere from what may be described as a fine filamentary mesh which pervades the bodies. Such a mesh provides connectivity that has an extremely high multiplicity. It has been shown that filaments which are thinner than the penetration depth in a gross superconductive body will remain superconductive in the presence of externally applied magnetic fields which exceed the critical field of the gross superconductive body. The filamentary mesh provides a plurality of current paths which enable larger currents to flow losslessly in the bodies and raise the critical current density, $J_c$.

A copending patent application entitled "Superconductive Devices," which was filed on November 2, 1961, as Serial No. 149,592, is assigned to the same assignee as the present application. In this copending application, a high field superconductive device is disclosed and claimed which comprises a solid high field superconductive body having an aperture therethrough, means to produce a magnetic field generally parallel to the axis of the aperture within the aperture of the body, means to maintain the temperature of the body below its critical temperature, and means for compressing the magnetic field.

It would be desirable to provide a high field superconductive device for compressing a magnetic field confined substantially within an aperture in the device. It would also be advantageous to vary the compression of the magnetic field within the device.

It is an object of our invention to provide a high field superconducting device.

It is another object of our invention to provide a high field superconductive device for compressing a magnetic field confined within an aperture in the device.

It is a further object of our invention to provide a high field superconductive device with a magnetic field confined substantially within an aperture in the device thereby increasing the magnetic field strength thereof, which field can be varied in magnitude by compression.

In carrying out our invention in one form a high field superconductive device comprises a solid high field superconductive body having an aperture therethrough, means to produce a magnetic field generally parallel to the axis of the aperture within the aperture of the body, means to maintain the temperature of the body below its critical temperature, and means for compressing variably the magnetic field.

These and various other objects, features, and advantages of the invention will be better understood from the following description taken in connection with the accompanying drawing in which.

Figures 1, 2, 3, 4, 5, 6, 7, 8, 9:
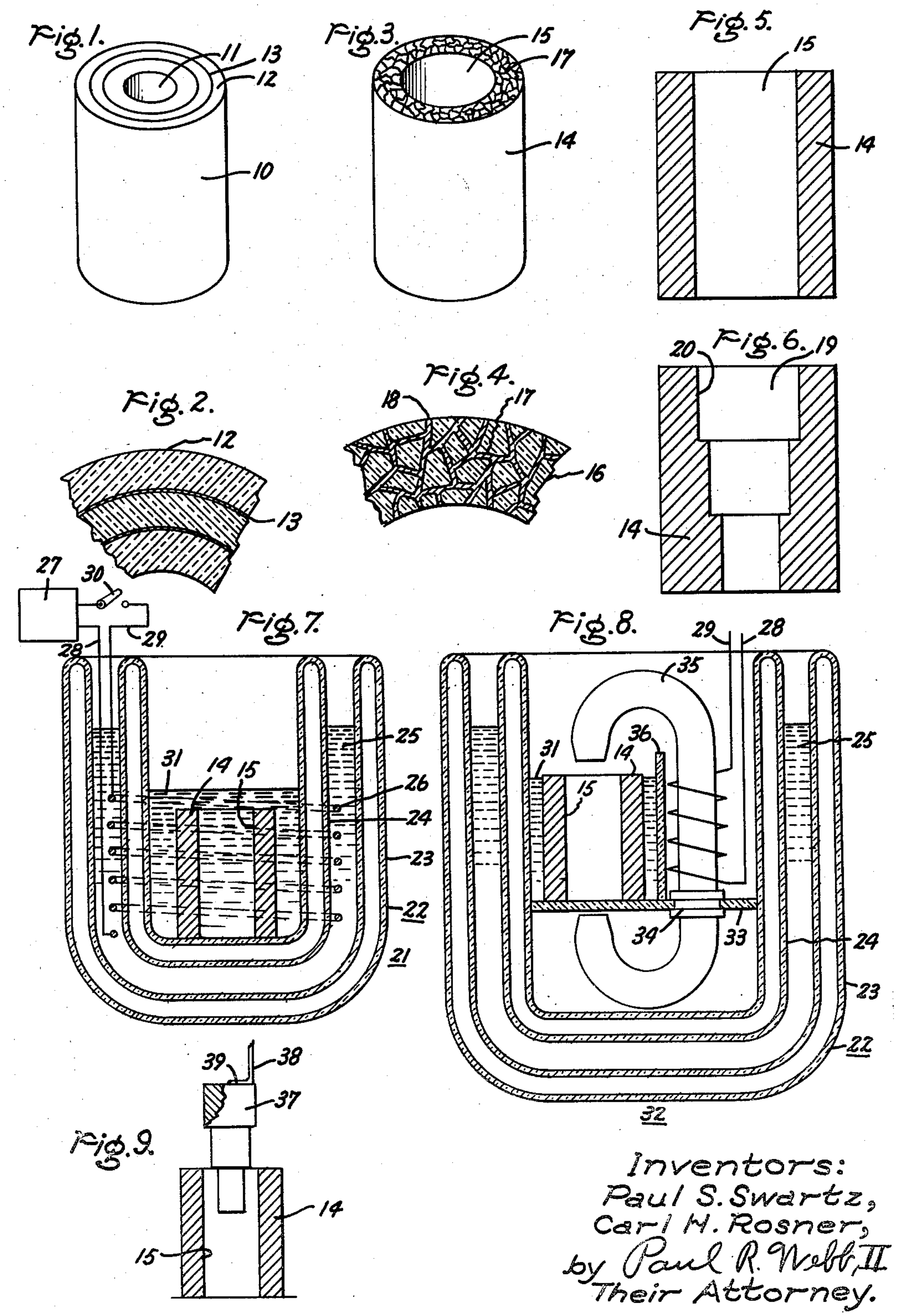
FIGURE 1 is a perspective view of a solid high field superconductive body.
FIGURE 2 is a fragmentary, transverse sectional view of the body shown in FIGURE 1.
FIGURE 3 is a perspective view of another solid high field superconductive body including superconductive filaments.
FIGURE 4 is a fragmentary, transverse sectional view of the body shown in FIGURE 2.
FIGURE 5 is a sectional view of the high field superconductive body shown in FIGURE 3.
FIGURE 6 is a sectional view of a modified solid high field superconductive body.
FIGURE 7 is a sectional view of apparatus for providing a high field superconductive device embodying our invention.
FIGURE 8 is a sectional view of a modified apparatus.
FIGURE 9 is a sectional view of a portion of a high field superconductive device embodying our invention.

In FIGURES 1 and 2 of the drawing, a solid high field superconductive body 10 is shown having a central aperture 11 therethrough. Body 10 comprises a plurality of non-superconductive layers 12 between which are positioned thin, continuous films 13 of a superconductive metal or alloy. For example, layers 12 are ceramic material while films 13 are tin. A thin film is defined as a film whose thickness, D, is less than the superconducting penetration depth, $\lambda$.

In FIGURES 3 and 4 of the drawing, a solid high field superconductive body 14 is shown having a central aperture 15 therethrough. For example, a superconductive matrix 16 has a filamentary network 17 filled with a superconductive material 18. Additionally, such a high field superconductive body can comprise a non-superconducting metallic or porous ceramic matrix with a filamentary network of a superconductive material therein. For example, mercury can be employed in the filamentary network of a porous ceramic matrix. FIGURE 5 shows aperture 15 of body 14 as being of uniform diameter.

In FIGURE 6, a modified solid high field superconductive body 14 having a non-uniform diameter, central aperture therethrough. Aperture 19 has a stepped inner wall 20 of decreasing varying diameter from the top to the bottom of the body.

In FIGURE 7, apparatus is shown generally at 21 for producing a high field superconductive device embodying our invention which comprises an insulated container 22 having an outer insulated vessel 23 and an inner insulated vessel 24 separated by liquid nitrogen 25. For example, a high field superconductive body 14 consisting of consolidated, partially reacted columbium and tin powders to form a continuous filamentary network of $Cb_3Sn$ and having an aperture 15 therethrough of the type shown in FIGURE 3 of the drawing is positioned within inner insulated vessel 24 and on the bottom thereof. A solenoid 26 surrounds the exterior wall of body 14 and is connected to a power source 27 by means of leads 28 and 29. A switch 30 is provided in lead 29 between solenoid 26 and power source 27 to energize and de-energize solenoid 26 to provide a magnetic field generally parallel to the axis of aperture 15 or at a slight angle thereto and within body 14 and aperture 15. Liquid helium 31 is poured into vessel 24 to immerse body 14 to cool the body below its critical temperature, $T_c$. If desired, solenoid 26 can be made of a superconductive material and positioned directly in liquid helium 31 to surround body 14.

In FIGURE 8 of the drawing, a modified apparatus 32 is shown for producing a high field superconductive device which comprises an insulated container 22 having an outer insulated vessel 23 and an inner insulated vessel 24 separated by liquid nitrogen 25. An insulated support member 33 is mounted on the inner wall of inner vessel 24 to provide a support for superconductive tube 14 positioned thereon and to provide a bottom wall to contain liquid helium 31 around and in contact with body 14 to cool the body below its critical temperature, $T_c$. A bracket 34 is positioned in member 33 to pivotally support an electromagnet 35. An insulated wall 36 surrounds electromagnet 35. A power source (not shown) is connected to electromagnet 35 by means of leads 28 and 29 therebetween. A switch (not shown) is provided in lead 29 to energize and de-energize electromagnet 35 to produce a magnetic field generally parallel to the axis of aperture 15 and within body 14.

In the operation of the apparatus shown in FIGURES 7 and 8, superconductive body 14 having an aperture 15 therethrough is positioned within inner insulated vessel 24 of insulated container 22. In FIGURE 7, body 14 is placed on the bottom of inner vessel 24 and in FIGURE 8, body 14 is placed on support member 33. In FIGURE 7, a solenoid 26 is positioned in vessel 23 in liquid nitrogen 25 to surround body 14 while in FIGURE 8 an electromagnet 35 is positioned surrounding the open ends of aperture 15. The switch is closed in the respective apparatus shown in FIGURES 7 and 8 to energize solenoid 26 and electromagnet 35 to produce a magnetic field generally parallel to the axis of aperture 15 and within body both 14 and its aperture 15. Liquid helium 31 is poured into the respective containers 24 to contact body 14 to cool body 14 from above to below its critical temperature, $T_c$. As body 14 is cooled below its critical temperature, the body becomes superconducting. When body 14 has become completely superconductive, the initial magnetic field which is parallel to the axis of the aperture and within the aperture is confined substantially therein. The switch is then opened to de-energize solenoid 26 or electromagnet 35 whereupon the applied magnetic field is terminated. The confined magnetic field within aperture 15 remains therein.

FIGURE 9 shows a high field superconductive device including the solid superconductive body 14 having a uniform diameter aperture therethrough and means for varying the compression of the magnetic field in the form of a high field, non-uniform diameter, stepped superconductive member 37 of the same length as the body. A rod 38 with bracket 39 provides for insertion of member 37 into aperture 15. Body 14 is positioned within an insulated vessel 24, as shown in FIGURE 7, in which liquid helium 31 is in contact with the exterior wall only of the body to maintain the temperature thereof below its critical temperature. A magnetic field is confined within the aperture by use of the apparatus shown in FIGURE 7 or 8. Superconductive member 37 is maintained at a temperature below its critical temperature. The insulated container and liquid helium have been omitted from this figure for simplicity.

When member 37 is inserted by rod 38 with its bracket 39 into aperture 15 of tube 14, the confined magnetic field is compressed within aperture 15 between stepped member 37 and the aperture wall to increase the magnitude of the field strength. Since both member 37 and body 14 are superconducting, the flux is excluded by both to the space therebetween. Member 37 varies the compression and thus the magnitude of the confined magnetic field by the different diameters of its stepped construction. The highest compression results at the point where the largest diameter step of member 37 is positioned within aperture 15. When member 37 is positioned completely within aperture 15, three compression magnetic field strengths of different magnitude exist. The member can be provided with a larger or smaller number of steps.

Figures 10, 11, 12, 13:
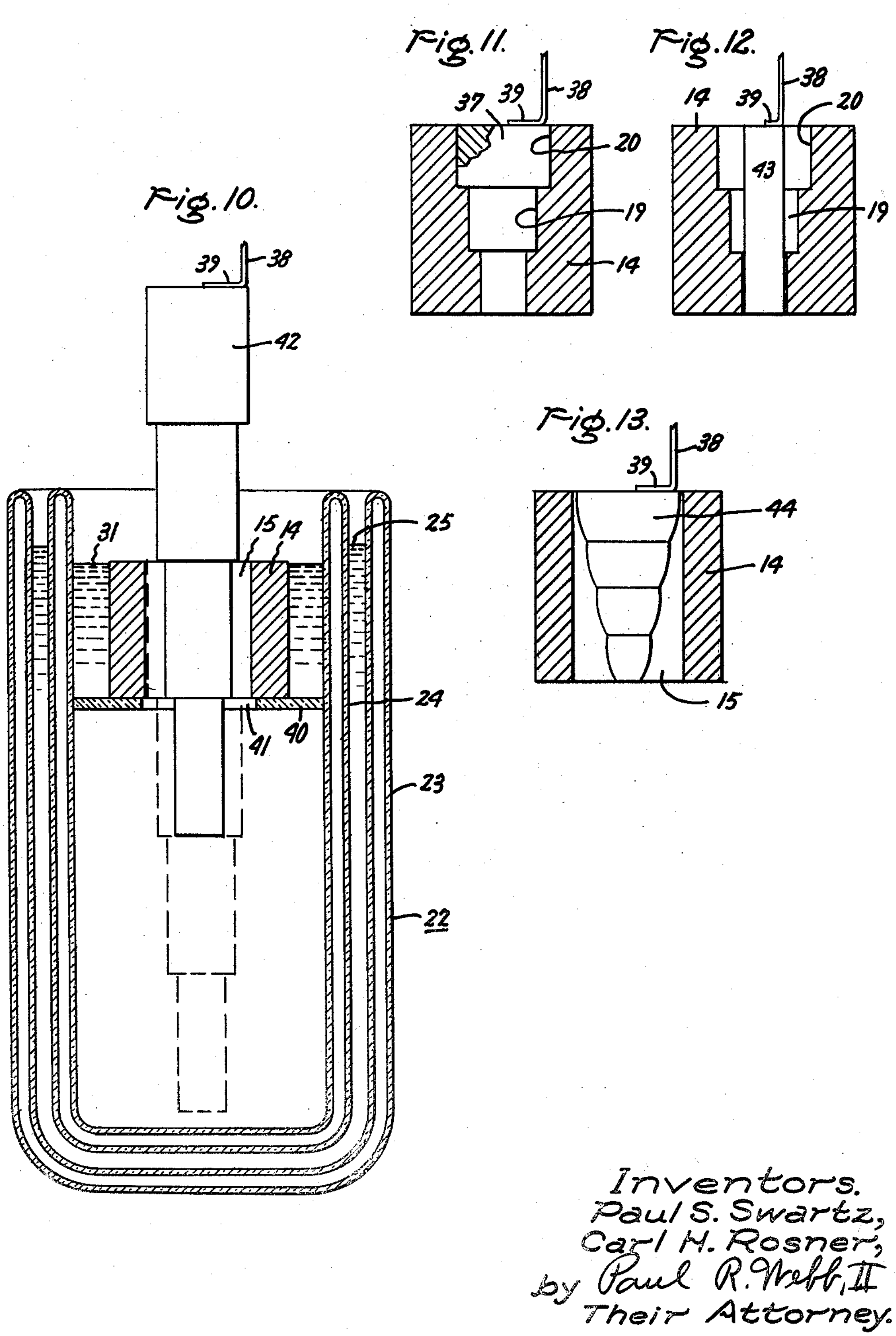
FIGURE 10 is a sectional view of a modified high field superconductive device.
FIGURE 11 is a sectional view of a portion of a modified high field superconductive device.
FIGURE 12 is a sectional view of a portion of a further modified high field superconductive device.
FIGURE 13 is a sectional view of a further modified high field superconductive device.

In FIGURE 10, a high field superconductive device is shown which comprises an insulated container 22 having an outer insulated vessel 23 and an inner insulated vessel 24 separated by liquid nitrogen 25. For example, a solid high field superconductive body or tube 14 having a uniform diameter aperture 15 therethrough is positioned on a support member 40 within inner insulated vessel 24. An aperture 41 is disposed centrally in member 40 and is in axial alignment with aperture 15 of tube 14. A magnetic field is confined within aperture 15 of body 14 by means of the apparatus shown in FIGURE 7 or FIGURE 8 of the drawing. Liquid helium 31 surrounds the exterior wall of body 14 to maintain the temperature of the body below its critical temperature. A high field non-uniform diameter, stepped superconductive member 42, which is maintained below its critical temperature, is shown partially positioned within aperture 15 of body 14 to vary the compression of the magnetic field in aperture 15. Each step of member 42 is approximately the same length as the length of aperture 15. While four such steps are shown as comprising member 42, a larger or smaller number of steps can be employed in such a member. Member 42 has a rod 38 and bracket 39 for inserting member 42 into aperture 15.

When member 42 is inserted into aperture 15 of body 14, the confined magnetic field in aperture 15 is compressed between member 42 and each stepped portion of the wall of aperture 15. Since both the member and the aperture wall are superconducting, the magnetic flux is excluded by both into the space therebetween. The highest compression of the confined magnetic field is obtained when the largest diameter step of member 42 is within aperture 15. In addition to varying the compression of the magnetic field by the insertion of a single step of member 42 in aperture 15, it is also possible to insert a portion of two adjacent steps to provide two compressed magnetic field strengths of different magnitude within the same aperture.

FIGURES 11, 12 and 13 show modified high field solid superconductive devices including a superconductive body 14 in the form of a tube and means for varying the compression of the magnetic field. For simplicity, the insulating container 22 and liquid helium 31 have been omitted from each of these figures.

FIGURE 11 discloses a solid high field superconductive body having a cylindrical outer wall, an aperture 19 therethrough, and a non-uniform diameter, stepped inner wall 20. A high field, non-uniform diameter stepped superconductive member 37 is positioned within aperture 19 of the body to vary the compression of the confined magnetic field therein. A rod 38 with bracket 39 provide means for inserting and withdrawing member 37.

FIGURE 12 shows a solid high field superconductive body having a cylindrical outer wall, a central aperture 19, and a non-uniform diameter, stepped inner wall 20. A high field uniform diameter, cylindrical superconductive rod 43 having a rod 38 attached thereto by means of bracket 39 is shown positioned within the superconductive body to vary the compression of the magnetic field confined within aperture 19. In this figure, the greatest compression is obtained between member 43 and the smallest diameter portion of aperture 19.

FIGURE 13 discloses a solid high field superconductive body 14 with a uniform diameter aperture 15 therethrough. A high field non-uniform diameter, tapered superconductive member 44 with a rod 38 attached thereto by means of bracket 39 is positioned within aperture 15 of body 14. When member 44 is inserted into aperture 15 the compression of the confined magnetic field within the aperture is varied. The greatest compression is obtained between the largest diameter portion of member 44 and the aperture wall.

In each of the above examples, the space between the super conductive member and the aperture wall provides a region in which material can be placed before or after the magnetic field has been compressed to subject the material to this field. If it is desired, the material, for example, in the form of a body or gaseous plasma can be surrounded by a thermally insulated container within the compressed field so that the material can be subjected to a temperature different from the temperature of the superconductive body and controlled by external means.

While other modifications of this invention and variations thereof which may be employed within the scope of the invention have not been described, the invention is intended to include such that may be embraced within the following claims.

What we claim as new and desire to secure by Letters Patent of the United States is:

1. A high field superconductive device comprising a solid high field superconductive body having a uniform diameter aperture therethrough, means to produce a magnetic field generally parallel to the axis of said aperture within the aperture of said body, means to maintain the temperature of said body below its critical temperature, and a non-uniform diameter, high field superconductive member maintained at a temperature below its critical temperature, said member adapted to be inserted into the aperture of said body for compressing variably said magnetic field.

2. A high field superconductive device comprising a solid high field superconductive body having a non-uniform diameter aperture therethrough, means to produce a magnetic field generally parallel to the axis of said aperture within the aperture of said body, means to maintain the temperature of said body below its critical temperature, and a uniform diameter, high field superconductive member maintained at a temperature below its critical temperature, said member adapted to be inserted into the aperture of said body for compressing variably said magnetic field.

3. A solid high field superconductive device comprising a high field superconductive body having a non-uniform diameter aperture therethrough, means to produce a magnetic field generally parallel to the axis of said aperture within the aperture of said body, means to maintain the temperature of said body below its critical temperature, and a non-uniform diameter, high field superconductive member maintained at a temperature below its critical temperature, said member adapted to be inserted into said aperture for compressing variably said magnetic field.

4. A high field superconductive device comprising a solid high field superconductive body having a uniform diameter aperture therethrough, means to produce a magnetic field generally parallel to the axis of said aperture within the aperture of said body, means to maintain the temperature of said body below its critical temperature, and a stepped, high field superconductive member of the same length as said body maintained at a temperature below its critical temperature, said member adapted to be inserted into said aperture for compressing variably said magnetic field.

5. A high field superconductive device comprising a solid high field superconductive body having a uniform diameter aperture therethrough, means to produce a magnetic field generally parallel to the axis of said aperture within the aperture of said body, means to maintain the temperature of said body below its critical temperature, and a stepped, high field superconductive body maintained at a temperature below its critical temperature, each step of said member of the same length as said body, said member adapted to be inserted into said aperture for compressing variably said magnetic field.

6. A high field superconductive device comprising a solid high field superconductive body having a uniform diameter aperture therethrough, means to produce a magnetic field generally parallel to the axis of said aperture within the aperture of said body, means to maintain the temperature of said body below its critical temperature, and a tapered, high field superconductive body maintained at a temperature below its critical temperature, said member adapted to be inserted into said aperture for compressing variably said magnetic field.

References Cited by the Examiner

UNITED STATES PATENTS 2,916,615 12/59 Lundburg ---------- 340—173.1
2,946,030 7/60 Slade --------------- 336—155

JOHN F. BURNS, *Primary Examiner.*